UNITED STATES PATENT OFFICE.

MORRIS B. MANWARING, OF BAYONNE, NEW JERSEY.

FOOD COMPOUND OR CONDIMENT.

SPECIFICATION forming part of Letters Patent No. 427,779, dated May 13, 1890.

Application filed August 21, 1889. Serial No. 321,532. (No specimens.)

*To all whom it may concern:*

Be it known that I, MORRIS B. MANWARING, of Bayonne, in the county of Hudson and State of New Jersey, have invented a certain new and useful Improvement in Food Compounds or Condiments, of which the following is a specification.

The object of my invention is to provide a condiment for food, comprising an aid to the active digestive principle of saliva.

The invention consists in an intimate admixture of diastase with table-salt in proper proportions to insure a sufficiency of the diastase to materially aid the digestion of starchy or farinaceous foods when the mixture is used during meals in the ordinary way as a condiment or seasoning.

It is found that if diastase be used undiluted its action is slow, because it is not brought quickly in contact with the starchy matters on which alone it acts, and as the time during which it can act is short, unless intimate contact is speedy, the time for action passes and the diastase is rendered inert by the acidity of the human stomach.

By diluting the diastase with a condiment which acts as an antiseptic in preserving the activity of the diastase, and at the same time as a seasoning material, I provide a convenient and useful form of diastase free from objection as regards taste, inasmuch as the proportion of table-salt employed in the mixture is very much greater than that of the diastase.

Other forms of diastase (such as "Extract of Malt," "Maltine," &c.) are objectionable for the reason that they cannot be used at the proper time or with the food.

In preparing my compound I employ pure dry vegetable diastase in powdered form or a dry extract of germinated malt or other cereals, which may be prepared by any of the well-known methods, and thoroughly mix the diastase with previously-dried and finely-powdered table-salt.

As to the proportions of the mixture, I have found that diastase is capable of transforming two thousand times its weight of starch. The average quantity of pure starch taken at a meal being about three ounces, and the average quantity of salt taken at a meal being about sixty grains, the mixture should contain about one per cent. of a two-thousand-test diastase. Of course I may vary the proportions above stated without departing from the spirit of my invention.

What I claim as my invention, and desire to secure by Letters Patent, is—

A condiment consisting of powdered diastase intimately mixed with finely-powdered table-salt, substantially as specified.

MORRIS B. MANWARING.

Witnesses:
C. R. FERGUSON,
S. O. EDMONDS.